United States Patent
Matsumoto

[15] 3,682,526
[45] Aug. 8, 1972

[54] HOLOGRAPHY WITH BLOCKED UNMODULATED OBJECT BEAM LIGHT

[72] Inventor: Kazuya Matsumoto, Kanagawa-ken, Japan

[73] Assignee: Canon Kabushiki Kaisha, Tokyo, Japan

[22] Filed: Aug. 19, 1970

[21] Appl. No.: 65,230

[30] Foreign Application Priority Data

Aug. 25, 1969  Japan..................44/67020

[52] U.S. Cl..................................350/3.5, 350/156.
[51] Int. Cl..............................................G02b 27/00
[58] Field of Search............350/3.5, 12, 13, 156, 147

[56] References Cited

UNITED STATES PATENTS

| | | | |
|---|---|---|---|
| 3,561,838 | 2/1971 | Gabor | 350/3.5 |
| 3,415,589 | 12/1968 | James | 350/152 |
| 2,018,963 | 10/1935 | Land | 350/156 |
| 3,532,406 | 10/1970 | Hartman | 350/3.5 |

OTHER PUBLICATIONS

" Photography by Polarized Light," Published by Eastman Kodak Co., Rochester, N.Y., April 1936

Nassimbene et al., " IBM Technical Disclosure Bulletin," Vol. 8, No. 10, Mar. 1966, p. 1396
Ross, " IBM Technical Disclosure Bulletin," Vol. 8, No. 10, Mar. 1966, p. 1404
Kock et al., " Proc of the IEEE," Vol. 55, No. 1, Jan. 1967, pp. 80- 81
Rudder, " Applied Physics Letters," Vol. 10, No. 10, May 1967, pp. 270- 272

*Primary Examiner*—David Schonberg
*Assistant Examiner*—Ronald J. Stern
*Attorney*—McGlew and Toren

[57] ABSTRACT

In the method and apparatus disclosed, a laser, a beam splitter, and one polarizer form two beams one of which is linearly polarized. The polarized beam is directed onto an object to be recorded so that the object depolarizes the light striking it, the depolarized light is sensed with a holographic sensing material through a second linear polarizer whose direction of polarization is transverse to that of the polarized beam. Thus effectively the second polarizer allows only light that has struck the object to reach the material. The second beam is directed to the other side of the sensing material. A mirror deflects part of the polarized light that does not strike the object back onto the shaded portions of the object. This reflected light is also depolarized by the object and sensed through the second polarizer.

15 Claims, 4 Drawing Figures

INVENTOR.
KAZUYA MATSUMOTO
BY McGlew and Toren
ATTORNEYS

HOLOGRAPHY WITH BLOCKED UNMODULATED OBJECT BEAM LIGHT

The present invention relates to a recording method and apparatus using volume-type holography, and particularly relates to a recording method using volume-type holography comprising splitting a source beam into two beams, illuminating an object with one of said split beams, analyzing the beam reflected from the illuminated object and directing both the analyzed beam and the other split beam onto a sensitive material from opposite sides, and a recording apparatus for volume-type holography comprising a beam splitter for splitting a source beam, an analyzer for reducing transmission of a beam directed thereon directly, an object stage and a holder for a sensitive material.

A preferred embodiment of the present invention involves placing an analyzer in front of a holographic sensitive material and at the same time placing a mirror near the sensitive material, using the light having a polarization direction crossing at a right angles with the plane of polarization of the above mentioned analyzer as the light source for illuminating an abject, and using said light reflected from the above mentioned mirror as the illuminating light for an object located in front area. The embodiment further involves making light reflected by an object of said illuminating light to the front plane of said holographic sensitive material through the above mentioned analyzer as the information light on the object, and at the same time directing linearly polarized light having the polarization direction not crossing with the plane of polarization of the above mentioned analyzer, which interferes with said information light, to the rear plane of the above mentioned holographic sensitive material as a reference light.

Detailed explanation shall be made hereinafter referring to the attached drawings in which.

Figure 1:
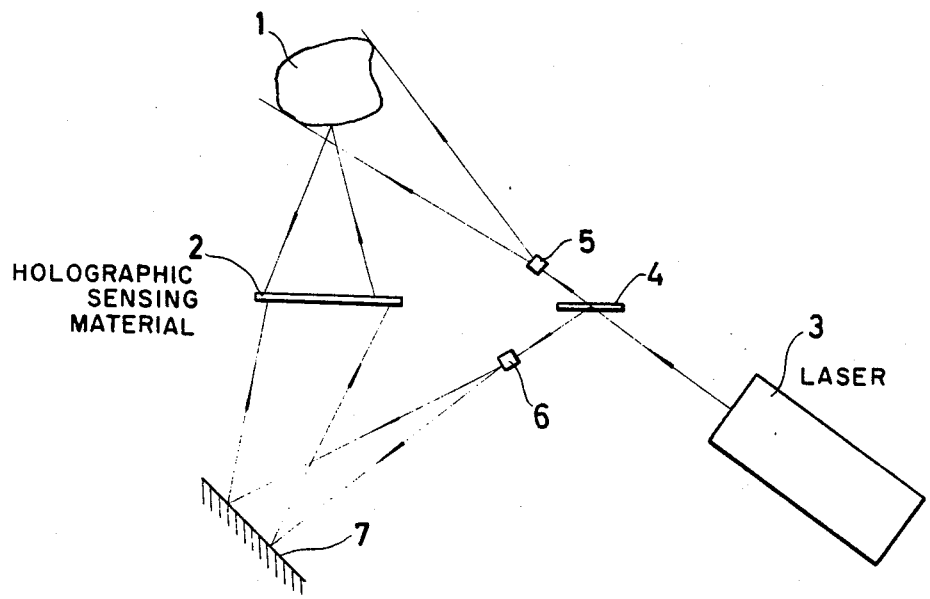
FIG. 1 shows a conventional recording apparatus using a volume-type holography.

The volume-type hologram is a kind of hologram. As shown in FIG. 1 a reference light, for recording is directed onto a sensitive material 2 from the side opposite to an object 1 to make a hologram. A hologram prepared in this manner is different from a planar hologram. The latter is prepared by putting a sensitive material in the reference wave coming from the same side as the object. With a planar hologram a regenerated image can not be obtained unless the light has an interference characteristic as laser beam, regenerated a rejuvenated image may be easily obtained even with a white colored beam such sun light or a household incandescent lamp.

FIG. 1 pertains to the type of photography which has been practiced conventionally, wherein the beam irradiated from a laser 3 is divided into two parts by a beam-splitter 4, and one of thus divided beams is diverted by a microscopic objective lens 5 and illuminates the object 1, while the other beam is diverted by a microscopic objective lens 6 and is directed onto the holographic sensitive material 2 as reference light with the aid of a mirror 7.

Figure 2:
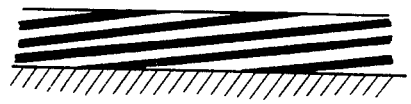
FIG. 2 shows a pattern of the interference fringes formed in a direction of depth of a sensitive material by a volume-type holography.

The light reflected from the object interferes with the reference light and volume-type interference fringes are formed in a direction of the depth of the sensitive material 2, as shown in FIG. 2.

As these interference fringes are similar to a crystaline structure, so-called Bragg's reflection takes place, and the reflected light, when white colored beam is used, will have only the wave length to satisfy the Bragg's reflective condition. Eventually it will have same results as when the hologram is illuminated by a mono-colored beam, thus the regenerated image of mono-color may be obtained even with a white colored beam.

When the emulsion material has sufficient thickness, good wave-length-selectivity can be secured, but in an ordinary photographic plate the number of layers of interference fringes formed in the emulsion material is small, thus the reflected wave will have a certain broadening from the described mono-chromatic wave length.

As a result, the resolving power of the regenerated image will be lowered. And the degree of this lowering will be high when the object is positioned far from the holographic sensitive material and will be low when the object is close to the material. Therefore, in the volume-type hologram recording a clear image can be obtained by positioning an object as close to the holographic sensitive material as possible.

Figure 3:
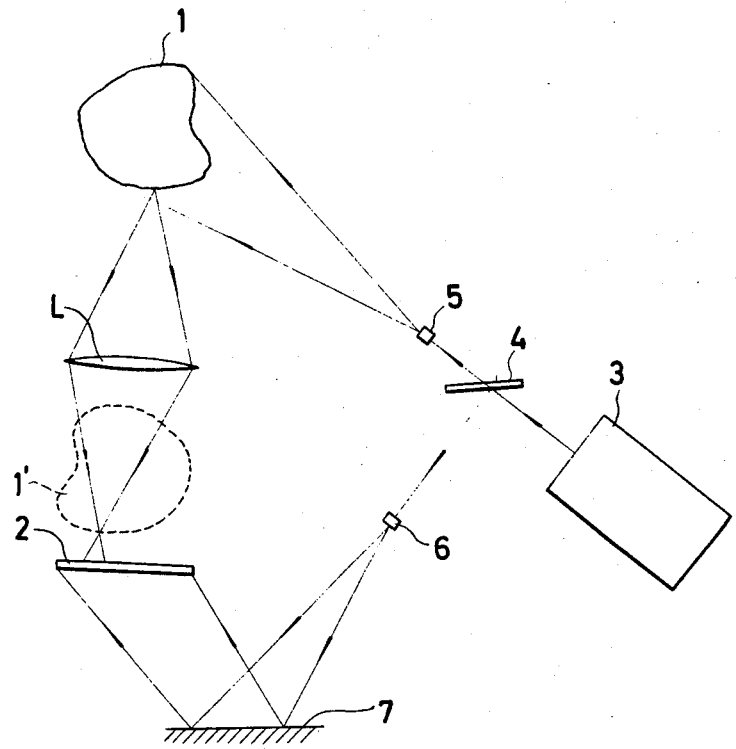
FIG. 3 shows a recording apparatus by the volume-type holography provided with an imaging relay lens.

For the same reason, a good image can be obtained in the apparatus provided with an imaging relay lens shown in FIG. 3.

That is, an object image 1' of an object 1 is formed near the sensitive material by an imaging lens L, thus the object is equivalently brought close to the sensitive material.

As has been explained above, better image can be obtained as an object is placed as close to the holographic sensitive material as possible, but the object can not be brought closer beyond a certain limitation for a proper illumination of an object.

The present invention is to provide a recording method using a volume-type holography which method is very effective when an object is illuminated by bringing the object close to the sensitive material, and can produce an image clearer than that obtainable by a conventional method, and at the same time can be achieved with a recording apparatus of compact structure.

Figure 4:
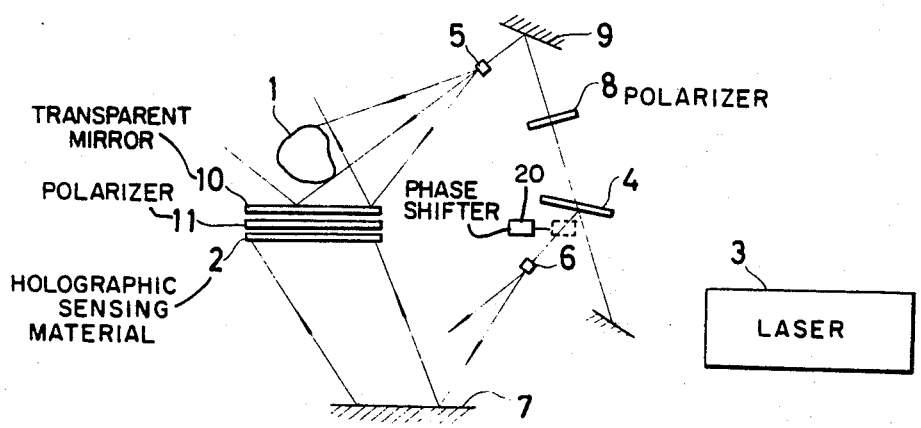
FIG. 4 is a schematic side elevation of an example showing the recording apparatus according to the present invention.

Next, an example of the present invention shall be explained in detail referring to FIG. 4. Explanation shall be made for the case where the laser used includes internal cavity mirrors and is of an elliptic polarization.

The laser beam emitted from a laser device 3 is, with the aid of a suitable mirror, divided into two beams by a beam splitter 4. One of thus divided beams is diverted by a microscopic objective lens 6 and illuminates a dry plate 2 as a reference light reflected by a mirror 7.

The other one of the beams split by 4 becomes linearly polarized light by a polarizer 8 and is, with the aid of a mirror 9, diverted by a microscopic objective lens 5. A part of luminous flux directly illuminates an object 1, while the other part is reflected by a transparent mirror 10 positioned in front of a holographic sensitive material 2 and illuminates the object 1.

An analyzer 11 is placed between the mirror 10 and the holographic sensitive material 2 in such manner that its plane of polarization crosses at a right angle with the polarization direction of the object illuminating light.

The FIG. 4, the object illuminating light which reaches the mirror 10 directly from the lens 5 and penetrates the mirror 10 is cut by the analyzer 11, thus not reaching the holographic sensitive material 2. On the other hand, the light reflected from the object 1 is generally elliptically polarized, and so some portion of the reflected light passes through the analyzer 11 and reaches the holographic sensitive material 2, and interferes with the reference light mentioned above, thus, a volume-type hologram is formed.

The above example uses a laser beam circularly polarized as in an internal cavity mirror laser. When a laser beam having linear polarization, such as external cavity mirror laser having a Brewster's window is used, the polarizer 8 is not necessary. In this case as the polarization direction of the light reflected from the object and passing through the analyzer 11 crosses at a right angle with the polarization direction of the reference light, it is necessary to rotate the direction of polarization of the reference light or convert the reference light into a circularly polarized light or an elliptically polarized light. For this purpose, as an example, a compensating plate with a phase difference of $\lambda/4$ ($\lambda$ being indicative of wave length of the light) may be placed in an optical path of the reference light.

As another example, an arrangement may also be possible using a totally reflecting mirror in place of the mirror 10. The analyzer 11 and the holographic sensitive material 2 near the provided near the directly behind the analyzer are then arranged at a peripheral side of the mirror. The totally reflective mirror in this case is used to illuminate the sensitive material side of the object 1, and the light reflected from the object 1 enters the sensitive material 2 via the analyzer 11. In this case the analyzer 11 becomes necessary to cut the light directly entering the sensitive material 2 from the light source.

In short, in the present invention, an analyzer is used at the time when the object information light obtained as the object illuminating light reflected by the object is interferred with a reference light, and thus the object information can be recorded and photographed with high contrast, and further by positioning the object near a holographic sensitive material, the resolving degree of the regenerated image can be enhanced as compared to that obtainable by the conventional recording apparatus. Furthermore, the illumination of a portion of an object facing a holographic sensitive material can be attained with the aid of a mirror, therefore the recording and photographing of a portion of the object facing the holographic sensitive material can be performed, and the apparatus itself can be compactly composed.

In case the object is of transparent planar structure, the mirror 10 may be substituted with the object itself. In this case an object holder is positioned directly close to the analyzer and beams of different polarity are directed from opposite sides.

Where necessary a phase shifter may be inserted into the reference beam path as shown in FIG. 4.

What is claimed is:

1. The method of making a holographic record of a subject, which comprises forming a first beam of light and a second beam of light, directing the first beam of light at a recording medium, directing the second beam at a subject so that light may be reflected from the subject toward the medium, locating the medium relative to the subject and directing the second beam so that at least a portion of the light from the second beam bypasses the subject and is directed at the medium, reflecting at least a portion of the light of the second beam directed at the medium toward the subject, and limiting the intensity of the portion of the second beam which bypasses the subject and is directed at the medium by polarizing the second beam before it strikes the subject and subjecting the light between the subject and the medium to polarization that limits the intensity of the portion of the second beam that is polarized.

2. The method as in claim 1, wherein the step of limiting includes substantially blocking the effect of the portions of the second beam which bypass the subject upon the medium by subjecting the light between the subject and the medium to polarization that substantially cancels the portion of the second beam directed at the medium in bypassing the subject.

3. The method as in claim 2, wherein the step of polarizing the second beam before it strikes the subject includes linearly polarizing the second beam in one direction, and wherein the step of subjecting the light to polarization includes linearly polarizing the light transverse to the one direction between the subject and the medium.

4. The method as in claim 2, wherein the first beam is directed toward one face of the recording medium and the second beam is directed toward the opposite face of the recording medium, said recording medium being substantially flat and having two faces.

5. The method as in claim 3, wherein the first beam is directed toward one face of the recording medium and the second beam is directed toward the opposite face of the recording medium, said recording medium being substantially flat and having two faces.

6. The method as in claim 5, wherein the step of reflecting includes locating a transparent mirror between the subject and the medium.

7. The method as in claim 6, wherein the step of forming the second beam and the first beam includes the step of generating a single source beam from a source and forming the two beams with a beam splitter.

8. The method as in claim 7, wherein the step of forming the source beam includes forming the source beam as a coherent beam with a laser.

9. The method as in claim 8, wherein the first beam is adjusted sufficiently to include light polarized in a manner comparable to the polarization effected by the step of subjecting the light between the subject and the medium to polarization.

10. An apparatus for holographic recording of a subject, comprising beam forming means for forming a first beam of light and a second beam of light, holographic recording means for forming a holographic recording, first beam directing means for directing the first beam toward the holographic recording means, second beam directing means for directing the second beam so that a portion of the light of the second beam strikes the subject and a second portion of the light from the second beam bypasses the subject and is directed toward the medium; protector means for substantially limiting the intensity of the second portion of the second beam that bypasses the subject and is directed at said recording means; said protector means including polarizing means positioned in the path of the second beam before the subject for polarizing the second beam before it reaches the subject, and second polarizing means positioned between the subject and the recording means for polarizing the light from the subject in such a manner that the portion of the beam which bypasses the subject is reduced in intensity; and reflecting means for reflecting a part of the second portion of the second beam which is directed at the medium, onto the subject.

11. An apparatus as in claim 10, wherein said recording means is flat and has two faces, and wherein light from the subject is directed at one face of said recording means and said first beam is directed at the other face of said recording means.

12. An apparatus as in claim 10, wherein said reflecting means includes transparent mirror means located between the subject and said recording means for reflecting light from the second portion of the second beam toward the subject and thereby illuminating the subject.

13. An apparatus as in claim 12, wherein said second polarizing means is located between said mirror means and said recording means.

14. An apparatus as in claim 13, wherein said first polarizing means linearly polarizes said second beam in one direction and said second polarizing means linearly polarizes said second beam in a direction transverse thereto.

15. An apparatus as in claim 14, wherein said beam forming means includes laser means for forming a source beam of coherent light, and beam splitter means for forming the two beams.

* * * * *